US009928530B2

(12) United States Patent
Krishnan et al.

(10) Patent No.: US 9,928,530 B2
(45) Date of Patent: *Mar. 27, 2018

(54) DIGITIZATION OF A CATALOG OF RETAIL PRODUCTS

(71) Applicant: INTERNATIONAL BUSINESS MACHINES CORPORATION, Armonk, NY (US)

(72) Inventors: Nagesha Rao Krishnan, Bangalore (IN); Anbumunee Ponniah, Bangalore (IN); Soumya Prasada, Bangalore (IN); Sudhanshu S. Sar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,579

(22) Filed: Jan. 19, 2017

(65) Prior Publication Data
US 2017/0308939 A1 Oct. 26, 2017

Related U.S. Application Data

(63) Continuation of application No. 15/134,457, filed on Apr. 21, 2016.

(51) Int. Cl.
G06Q 30/00 (2012.01)
G06Q 30/06 (2012.01)

(52) U.S. Cl.
CPC ..... *G06Q 30/0603* (2013.01); *G06Q 30/0629* (2013.01); *G06Q 30/0643* (2013.01)

(58) Field of Classification Search
None
See application file for complete search history.

(56) References Cited

U.S. PATENT DOCUMENTS 7,120,592 B1 * 10/2006 Lewis ................... G06Q 20/12
705/14.34
7,792,838 B2 * 9/2010 Ranganathan .... G06F 17/30734
707/739

(Continued)

FOREIGN PATENT DOCUMENTS

EP 2600291 A1 6/2013

OTHER PUBLICATIONS

"Product Counting using Images with application to Robot-based Retail Stock Assessment" (Kejriwal, Garg, Kumar Innovation Lab, Tata Consultancy Services, New. Dehhi, India. 2015 IEEE.) (Year: 2015).*

(Continued)

*Primary Examiner* — Courtney L Stopp
(74) *Attorney, Agent, or Firm* — Michael O'Keefe

(57) ABSTRACT

Embodiments of the present invention disclose a method, computer program product, and system for catalog digitization. A method including receiving observed information including physical attributes of a plurality of products, assigning an importance to each physical attribute, organizing the products into product categories based on the physical attributes and their corresponding importance, determining a product profile for of the products based on the product category of each of the products and a likelihood of any two attributes being observed together with respect to each of the products, identifying a match between two products based on a similarity between the physical attributes of the two products and their corresponding importance, and a comparison between the product profiles of the two products, preparing a product description based on a combination of the physical attributes of the two matching products, and creating a digital product catalog comprising the product description.

1 Claim, 4 Drawing Sheets

(56) References Cited

U.S. PATENT DOCUMENTS

| | | | | |
|---|---|---|---|---|
| 8,352,473 B2* | 1/2013 | Fuxman | ............. | G06Q 30/0281 |
| | | | | 705/343 |
| 8,738,662 B2* | 5/2014 | de Heer | ............. | G06Q 30/0603 |
| | | | | 707/600 |
| 8,977,603 B2* | 3/2015 | Pate | ................. | G06Q 30/02 |
| | | | | 706/14 |
| 9,460,190 B1* | 10/2016 | Hein | ................ | G06F 17/30598 |
| 2003/0154141 A1* | 8/2003 | Capazario | ............ | G06Q 10/087 |
| | | | | 705/26.1 |
| 2004/0254950 A1* | 12/2004 | Musgrove | ......... | G06F 17/30327 |
| 2007/0100713 A1* | 5/2007 | Del Favero | .......... | G06Q 10/087 |
| | | | | 705/29 |
| 2008/0208713 A1* | 8/2008 | Vadlamani | .......... | G06Q 30/0601 |
| | | | | 705/27.1 |
| 2010/0217684 A1* | 8/2010 | Melcher | ............. | G06Q 30/0603 |
| | | | | 705/26.1 |
| 2012/0037700 A1 | 2/2012 | Walji et al. | | |
| 2012/0290447 A1* | 11/2012 | Hershenson | ........ | G06Q 30/0277 |
| | | | | 705/27.2 |
| 2014/0019285 A1* | 1/2014 | Karthik | ................. | G06Q 30/08 |
| | | | | 705/26.3 |
| 2015/0026019 A1* | 1/2015 | Lekas | ................. | G06Q 10/087 |
| | | | | 705/28 |
| 2015/0235296 A1* | 8/2015 | Hamilton | ........... | G06Q 30/0627 |
| | | | | 705/26.63 |

OTHER PUBLICATIONS

Pending U.S. Appl. No. 15/134,457, filed Apr. 21, 2016, entitled: "Digitization of a Catalog of Retail Products", 39 pages.
IBM: List of IBM Patents or Patent Applications Treated As Related (Appendix P), Dated Jan. 18, 2017, 2 pages.

* cited by examiner

DIGITIZATION OF A CATALOG OF RETAIL PRODUCTS

BACKGROUND

The present invention relates generally to a method, system, and computer program product for digitizing a catalog of products in various retail contexts, and more particularly to a method, system, and computer program product for digitizing a catalog of products in a non-intrusive and minimally time intensive manner with specific benefits for unorganized retail sectors.

One the main challenges in getting a retailer of small to medium size (for example, kirana shops in India) to be up and running on an eCommerce platform is to get a digital catalog in place as quickly as possible. There are currently various ways to digitize merchandise, for example, using barcodes supplied by a product manufacturer. A challenge in creating the digital catalog is that products to be included must be carefully scanned and entered into a system which is time consuming, especially for a retailer with limited resources.

SUMMARY

One Embodiments of the present invention disclose a method, computer program product, and system for catalog digitization. A method including receiving observed information including physical attributes of a plurality of products, assigning an importance to each physical attribute, organizing the plurality of products into product categories based on the physical attributes and their corresponding importance, determining a product profile for each of the plurality of products based on the product category of each of the plurality of products and a likelihood of any two attributes being observed together with respect to each of the plurality of products, identifying a match between two products of the plurality of products based on a similarity between the physical attributes of the two products and their corresponding importance, and a comparison between the product profiles of the two products, preparing a product description based on a combination of the physical attributes of the two matching products, and creating a digital product catalog comprising the product description.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention generally relates to creation of an on-line catalog of retail products which are available in a store. A way to create an on-line catalog is to combine input from multiple input sources and to utilize product recognition. Product recognition is a process where a product is recognized within an image or video. An embodiment by which to create an on-line catalog is described in detail below by referring to the accompanying drawings in FIGS. 1 to 4. Those skilled in the art will readily appreciate that the detailed description given herein with respect to these figures is for explanatory purposes as the invention extends beyond these limited embodiments.

Figure 1:
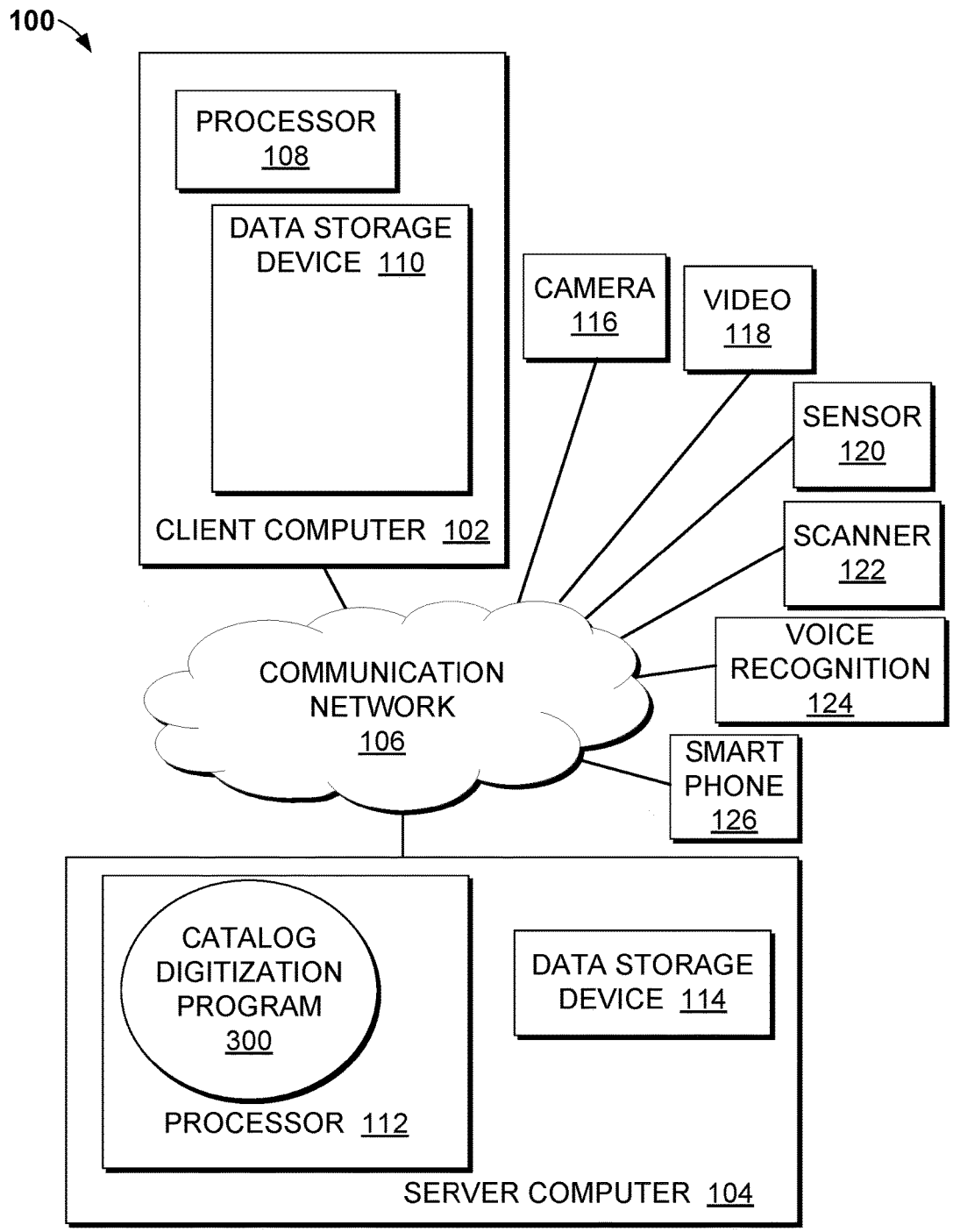
FIG. 1 is a functional block diagram illustrating a catalog digitization program in a networked computer environment, in accordance with an embodiment of the present invention.

Referring now to FIG. 1, a functional block diagram illustrating a system 100 for creating an on-line digital catalog in a networked computer environment, in accordance with an embodiment of the present invention is shown. The system 100 may include a client computer 102, a server computer 104, a still camera 116, a video or video camera 118, a sensor 120, a barcode scanner or scanner 122, a voice recognition device 124, a smart phone 126 or some combination thereof. The client computer 102 may communicate with the server computer 104 via a communications network 106 (hereinafter "network"). The client computer 102 may include a processor 108 and a data storage device 110, and is enabled to interface with a user and communicate with the server computer 104. The server computer 104 may also include a processor 112 and a data storage device 114 that is enabled to run a catalog digitization program 300, (hereinafter "program"). The still camera 116, the video 118, the sensor 120, the barcode scanner 122, the voice recognition device 124 and the smart phone 126 may be enabled to interface with the program 300 via the network 106.

In an embodiment, the client computer 102 may operate as an input device including a user interface while the program 300 may run primarily on the server computer 104. In an alternative embodiment, the program 300 may run primarily on the client computer 102 while the server computer 104 may be used for processing a storage of data used by the program 300.

It should be noted, however, that processing for the program 300 may, in some instances be shared amongst the client computer 102 and the server computer 104 in any ratio. In another embodiment, the program 300 may operate on more than one server computer 104, client computer 102, or some combination of server computers 104 and client computers 102, for example, a plurality of client computers 102 communicating across the network 106 with a single server computer 104.

The network 106 may include wired connections, wireless connections, fiber optic connections, or some combination thereof. In general, the network 106 can be any combination of connections and protocols that will support communications between the client computer 102 and the server computer 104. The network 106 may include various types of networks, such as, for example, a local area network (LAN), a wide area network (WAN) such as the Internet, a telecommunication network, a wireless network, a public switched network and/or a satellite network.

In various embodiments, the client computer 102 and/or the server computer 104 may be, for example, a laptop computer, tablet computer, netbook computer, personal computer (PC), a desktop computer, a personal digital assistant (PDA), a smart phone, a mobile device, a camera, a video camera, a sensor, a voice recognition device, or any programmable electronic device capable of communicating with the server computer 104 via the network 106. As described below with reference to FIG. 4, the client computer 102 and the server computer 104 may each include internal and external components.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

In an embodiment, the system 100 may include any number of client computers 102, server computers 104, still cameras 116, video cameras 118, sensors 120, barcode scanners 122, voice recognition devices 124, and/or smart phones 126; however only one of each is shown for illustrative purposes only. It may be appreciated that FIG. 1 provides only an illustration of one implementation and does not imply any limitations with regard to the environments in which different embodiments may be implemented. Many modifications to the depicted environments may be made based on design and implementation requirements.

The program 300 and associated methods are described and explained in further detail below with reference to FIGS. 2-4.

The present invention generally relates to assisting a shopkeeper in the creation of a digital catalog by which the shopkeeper can sell goods through the internet. A shopkeeper with a small retail store may have limited resources to access a computer. The shopkeeper may depend on manually written recordkeeping and order taking and may not have a digital inventory nor computer tracking of orders. Cameras and video equipment, among other equipment, may be mounted in the retail store and collect information without interfering with the daily operation of the retail store. This invention may collect or capture photographs and video and other input and use the collected information to create a digital catalog.

Figure 2:
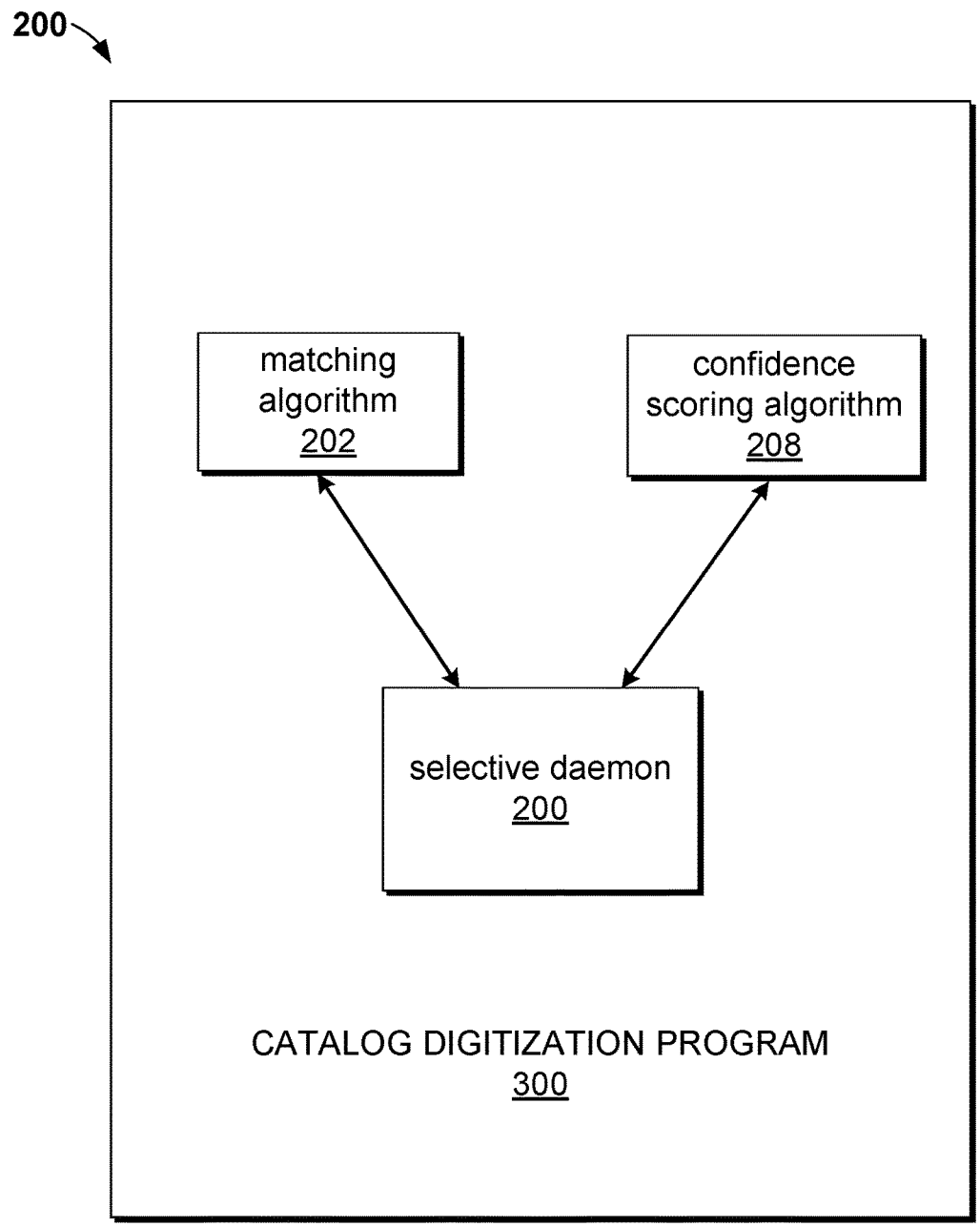
FIG. 2 is a schematic block diagram corresponding to components and algorithms associated with the catalog digitization program of FIG. 1, in accordance with an embodiment of the present invention.

Referring now to FIG. 2, one or more components and algorithms associated with the program 300 are illustrated running on the server computer 104, according to an exemplary embodiment. As used herein, the program 300 includes functionality that the operating system performs on behalf of the program 300, such as retrieving environment variables, and reading files.

A selective daemon 200, may take as input, among other things, matching algorithm 202, and confidence scoring algorithm 208.

The matching algorithm 202 may be shown and described through an algorithm, configuration rules, and components that are specialized for performing matching. However, it may be appreciated that matching algorithm 202 may be embodied in components and reconfiguration rules other than those described.

Following is a description of the matching algorithm 202, in an exemplary embodiment. The matching algorithm 202 may use parameter importance values and affinity values. Parameter importance values may be referred to as an importance.

A product profile of a product may be made from input to the program 300, as described below in relation to FIG. 3. The product profile may include one or more parameters which may help identify the product. Parameters may include, for example, a barcode, dimensions, shape, weight, color, text, number, symbols, company symbol, images, a neighboring product profile from a store, neighboring product profile from a storage area, weight, a price, words spoken when someone is holding or pointing to the product. Parameters values may describe the product, and parameter values may also describe information such as product location in the store, identify products which are in close proximity, due to like products being stored adjacent to each other. Examples of parameter values may be red, 2 lb., 5" inches square. Information captured from the still camera 116, the video or video camera 118, the sensor 120, the barcode scanner 122, the voice recognition device 124 and the smart phone 126, among other inputs, may provide a significant amount of individual parameter information. For example, there may be several thousand photographs from the still camera 116, a thousand hours of video from the video camera 118 and perhaps two thousands snippets of conversation from the voice recognition device 124. Individual inputs may contain one or more parameters which by themselves do not completely identify a product. The matching algorithm 202, or an alternate algorithm, may be used to group individual inputs, in order to identify that this set of individual inputs belong to a product and may identify a more complete product profile of that product. The matching algorithm 202, or the alternate algorithm, may be continuously learning and improved to provide more accurate results.

Each of the parameters may be assigned a parameter importance value, which may help to identify parameters which may be more helpful in identifying the product. A parameter importance value may have a range, for example of "1 to 10", with a higher number being a parameter importance value which has been assigned to be more important in identification of the product. The parameter importance values may depend on the industry and may be assigned or modified by an administrator. The parameter importance values may change over time as more information is collected and the relative values of parameters are deemed more or less important in the identification of a product. Parameters can be clustered, or grouped together. Certain parameters may have low importance in recognizing the product and may be grouped together as a low bucket value, while other parameter values may have medium or high importance in recognizing the product and may have a medium or high parameter importance value and be grouped medium bucket value, and high bucket value, respectively. For example, the parameter value of brand initially may be deemed a high parameter importance value or high bucket value, and the parameter value of size may be deemed a low parameter importance value or low bucket value. However, over time, this may switch and the parameter importance value of size may be deemed a high bucket value and the parameter importance value of brand may be deemed a low bucket value. Parameter importance values between 1 and 2 may be considered low parameter bucket value, parameter importance values between 3 and 7 may be considered medium bucket value, and parameter importance values between 8 and 10 may be considered high bucket value.

Continuous profiling may be performed from input, for example video input, which may help to document a product journey though the store, for example, from arrival at the store, to a storage area, to a shelf in the store, to the checkout counter, and help to ensure multiple product profiles are captured of the same product.

Each profile may contain a group of parameters. Each time a product is profiled, one or more product value parameters may be identified. A product may have multiple profiles. After collecting multiple profiles, the profile value parameters of one product may be compared to the profile value parameters of a second product to identify like products. Each of the profiles may contain a subset of value parameters and some of the value parameters may overlap. Value parameters may be compared individually, or in combination of two or more value parameters. The value parameter comparison may identify a likelihood of a product match or a product which is similar. Once the comparisons are complete, the first product and the second product may be determined to be the same product and may help to identify more completely the parameter values of the product. A comparison of parameters values may not lead to an exact match between two products. An algorithm may be used for further comparison between products to identify if the products are the same product. The algorithm may take into consideration a confidence level of the parameter importance value, the parameter value and affinity values.

In image processing and voice processing, various image processing and voice processing algorithms may be used to identify parameter values from other images and sensor information.

For example, a product match may occur when two different products have the same parameter values, for example, parameters may include: clothing, size and color, while the parameter values may include pants, size 5, and brown, respectively. A similar product may have a high affinity where many of the parameter values match, but not all of them. For example, a product may have the parameter values of: pants, size 6, brown. A similar product may have the parameter values of pants, size 5, brown.

A product may be assigned a set of parameters and a parameter importance value for each parameter. For example, there may be three parameters, $p_1$, $p_2$ and $p_3$, where $p_1$ is size, $p_2$ is color and $p_3$ is brand. Each of the parameters may have an assigned parameter importance value, $p_1(x)$, $p_2(x)$ and $p_3(x)$ for a product that may be represented by x. The assigned parameter importance value is determined by previous runs of the algorithm in a training environment and is configurable by the industry. A higher parameter importance value indicates higher importance in identifying the product. In an example, $p_1(x)=2$, $p_2(x)=3$ and $p_3(x)=10$, as shown in Table 1, below.

TABLE 1

| parameter | assigned parameter importance value |
|---|---|
| $p_1$ = size | $p_1(x) = 2$ |
| $p_2$ = color | $p_2(x) = 3$ |
| $p_3$ = brand | $p_3(x) = 10$ |

An affinity value may be assigned to show an affinity between two of the parameter importance values. For example, $p_1(p_2)$ is the affinity value of $p_1$ to $p_2$, and $p_2(p_1)$ is the affinity value of $p_2$ to $p_1$, and $p_1(p_2)$ may not be the same as $p_2(p_1)$. A higher affinity value may indicate that two parameters values are commonly found together. The affinity value may indicate the likelihood of two parameter values occurring together. In data mining, this is also called a correlation or association factor. The affinity value may be called "confidence" probability in data mining.

In an example, the affinity value may range from 0 to 1. An affinity value of 1 may indicate that the two parameter values are highly likely to occur together, while an affinity value of 0 may indicate the two parameter values are not likely to occur together. Continuing in the prior example, the affinity value of $p_1$ to $p_2$, or size to color, may be low, the affinity value of $p_1$ to $p_3$, or size to brand, may also be low, and the affinity value of $p_2$ to $p_3$, or color to brand, may be higher. Results from statistical analysis from previous measurements or from industry data collection may determine the initial affinity values. Sample affinity values are shown in Table 2, below:

TABLE 2

| Affinity Values | | |
|---|---|---|
| $p_1(p_2) = 0$ | $p_1(p_3) = 0.1$ | $p_3(p_2) = 0.4$ |
| $p_2(p_1) = 0.7$ | $p_3(p_1) = 1.0$ | $p_2(p_3) = 0.8$ |

In this example, a certain size, p1, may not indicate a specific color of a product, p2, as shown in the table $p_1(p_2)=0$. However a specific color, p2, of a product may have a stronger correlation or affinity value to a size, p1, as shown in the table $p_2(p_1)=0.7$. The parameter $p_1$, size, may include sizes available of 1, 2, 3, 4 and 5. The parameter $p_2$, color, may include 5 colors which are available in sizes 1, 2, and 3, but only 2 colors are available in sizes 4 and 5. In this example the affinity value of $p_1$, size, to $p_2$, color, or $p_1(p_2)=0$, is low, while the affinity value of $p_2$ (color) to $p_1$, size, $p_2(p_1)=0.7$, is high.

Profile based matching can be characterized by the matching algorithm 202. The matching algorithm 202 may be represented as follows. Profile based matching may be used to identify a product to be the same as a previously identified product.

A profile value of a product x is P(x). P(x) may be calculated as summation of individual parameter importance values multiplied by affinity values as follows, where j and k each range from 0 to N, where N is the number of parameters values measured. Please note that $p_1$ is not the mathematical constant pi.

$$P(x) = \sum_{j,k=1, j \neq k}^{n} [p_j * p_j(p_k)]$$

Continuing in the above example, $P(x)=p_1*p_1(p_2)+p_1*p_1(p_3)+p_2*p_2(p_1)+p_2*p_2(p_3)+p_3*p_3(p_1)+p_3*p_3(p_2)$ $P(x)=2*0+2*0.1+3*0.7+3*0.8+10*1.0+10*0.4$ $P(x)=0+0.2+2.1+2.4+10+4=18$ In this example, a maximum profile value for 3 parameter importance values, which have 6 affinity values, where the 3 parameters are 1 to 10, and the affinity values are 0 to 1, is 60.

A profile value of the product x, P(x) may be compared with a profile value of a second product, P(y). Product x and product y may be compared via a comparison of one or more parameter values. A profile comparison may indicate the likelihood of a match or a similarity between the product x and the product y. A potential match is determined based on common parameter values of two products and may indicate if a match of profile values are within a pre-defined threshold, which is set by an administrator and industry historical data, and may change over time.

For example, to identify product x and product y to be the same product, or have a matching profile value, P(x) and P(y) would each have a values which are close. In order for P(x) and P(y) to have a value close to the other, the following may occur. The parameters available for product x may not be the same parameters available for product y. The parameters which are common to both product x and product y may be compared. If the common parameter values are compared and have a difference greater than a pre-determined threshold, then a comparison is stopped and the two products are declared as different. For example, a parameter of color with a parameter value of black is very different than a parameter of color with a parameter value of white. A parameter of color with a parameter value of black may not be very different than a parameter of color with a parameter value of gray, as lighting and angle during a photograph may result in black and gray appearing similarly. Continuing in this example, if the comparison between P(x) and P(y) is less than a pre-defined threshold, this may indicate a profile match. A profile match may indicate that the product x and the product y exhibit similarity across multiple parameter values overall, but not necessarily on individual parameter values by themselves.

The matching algorithm 202 may be used to identify two products with a similar profile value, and may be used to identify the two products as the same product. For example, if the profile value, P(x) is within the threshold for two products, they may both have the parameters of clothes, size and color which correspond to parameter values of pants, size 5, brown.

Similar calculations can be done for a smaller or larger combination of parameter values, as an optimization step to reduce calculation effort. Grouping of products can be achieved by grouping together products with a majority of similar parameter values into a category. Similarly, an approach can be taken to establish affinity between two products based on the category of each product and a comparison of parameter values of each product. Two products with overlapping affinity between parameter values may both be grouped in a same parent category. A parent category may be a group of similar items, for example clothing. A category may be a subset of a parent category, for example, shirts, shorts, pants, sweaters.

The assigned parameter importance value and the affinity values may be set by a category or parent category of product, for example food products, drug products, or clothing products. The parameter importance value and the affinity values may be adjusted over time as more information is accumulated. Initially parameter importance values and affinity values may be from a training set, and eventually affinity values may be determined for different categories such as apparel, grocery, pharmaceutical, flowers, etc.

The program 300 may contain a confidence scoring algorithm 208 which is described below, or another algorithm may be used to measure a confidence of the profile value of a product x, or P(x). The confidence scoring algorithm 208 may provide a final confidence scoring calculation of the product x, to insure the final confidence scoring calculation meets a final confidence scoring calculation threshold. The final confidence scoring calculation threshold is set by administrator and is learned and may change as more data is accumulated. The final confidence scoring calculation may be referred to as a confidence score. The minimum confidence score threshold may be referred to as a predetermined confidence threshold.

When a potential match of two different products is identified based on P(x) and P(y), a confidence scores of P(x) may be compared to insure that both met the minimum confidence score threshold.

As described above, each parameter is assigned a parameter importance value, which may be categorized into a bucket of low, medium and high value. Also as described above, each parameter is identified with a sequence of affinity values relative to other parameters. In an example, parameter importance values between 1 and 2 may be considered low parameter importance value or low value bucket, parameter importance values between 3 and 7 may be considered medium parameter value or medium value bucket, and parameter importance values between 8 and 10 may be considered high parameter importance value or high value bucket. An administrator may assign a bucket value based on the low, medium or high value buckets, and this may vary based on the category of the product x, and may change over time as more information is collected. The number of buckets, the assigned buckets, and the value of the buckets may vary based on the category of the product and may change over time. Categories of the product x may include pharmacy, grocery, clothing, kitchen items, etc. For the initial setup, if a category of a product is not known, the confidence scoring algorithm may be run with assigned bucket values based on several different categories. The resulting highest confidence scoring may be used to determine the correct category.

The confidence scoring algorithm 208 is executed in three stages: a direct scoring value calculation, an affinity scoring value calculation and a final confidence scoring value calculation.

The confidence scoring algorithm 208 has a first stage which uses the direct scoring value calculation. The direct scoring value calculation of the assigned parameter value $p_k$ of a product x is $D(p_k)$. In an example, k may be 1, 2 or 3, and we can calculate $D(p_1)$, $D(p_2)$ and $D(p_3)$. In other words, $D(p_1)$ is the direct scoring value of the parameter $p_1$. This is a calculation without the taking into consideration the affinity values. The direct scoring value measures the confidence value of parameters individually observed without any relationship between assigned parameter values or affinity between assigned parameter values taken into account. This measurement is used in the final confidence scoring value calculation. The maximum value of $D(p_k)$ may be ten times the number of parameters. In an example with three parameters and each parameter importance value has a maximum value of 10, the maximum value of $D(p_k)$ is thirty.

The direct scoring value of a parameter $p_k$, $D(p_k)$, may be calculated as follows, as the multiplication of an industry constant, C1, and a bucket value, $b_k$, and a probability value, $P(p_k)$. The industry constant, C1, may have a value between 0 and 1, may be assigned by an administrator and may change over time as more information is collected. A particular value of C1 may be set for a pharmacy, and a different value of C1 may be set for a convenience store. C1 may have a value between 0 and 1 and the default of C1 have a value of 1. The bucket value, $b_k$, is an assigned bucket value, which may depend on the category of the product x, be assigned by an administrator and may change over time as more information is collected. Continuing in the example, there are 3 parameters, and $b_1$, $b_2$ and $b_3$ have been assigned a number as shown below. The bucket value $b_k$ may have a value between 0 and 1, in this example.

In an example, parameter importance values between 1 and 2 may be low value bucket, and be assigned a bucket value of 0.2, parameter importance values between 3 and 7 may be considered medium value bucket, and be assigned a bucket value of 0.5, and parameter importance values between 8 and 10 may be considered high value bucket, and be assigned a bucket value of 0.8. Continuing with the example above, following are sample bucket values in Table 3. Table 3 contains the information in Table 2 plus the additional column of bucket value.

TABLE 3

| parameter | assigned parameter importance value | bucket value |
|---|---|---|
| $p_1$ = size | $p_1(x) = 2$ | $b_1 = 0.2$ |
| $p_2$ = color | $p_2(x) = 3$ | $b_2 = 0.2$ |
| $p_3$ = brand | $p_3(x) = 10$ | $b_3 = 0.8$ |

A probability value, or accuracy value, $A(p_k)$ or accuracy, of the measurements for the parameters $p_1$, $p_2$, and $p_3$ may be determined by an evaluation of collected information from the sensors, cameras, etc, and by use of sensing algorithms. An administrator may adjust it (for example, group or smoothen values) but not assign initial values themselves. The probability value may be used in the direct scoring value calculation. This is the probably that a parameter $p_k$ is accurately recognized. The probability value is provided by the sensors and the underlying voice recognition algorithms. The probability values may depend on quality of senor input, and the accuracy of the voice recognition algorithm and image recognition algorithm, among other inputs accuracies. In an example, $A(p_1)$ is a probably other inputs accuracies. In an example, $A(p_1)$ is a probably value of the accuracy for the parameter $p_1$, size, while $A(p_2)$ is a probably of the accuracy for the parameter $p_2$, color, and so on. The probably value, $A(p_k)$ is assigned based on the confidence of that parameter to be accurate. The values of $A(p_k)$ may have a range between 0 and 1. The following Table 4 shows sample values of $A(p_k)$. Table 4 contains the information in Table 3 plus the additional column of probability value.

TABLE 4

| parameter | assigned parameter importance value | bucket value | probability value |
|---|---|---|---|
| $p_1$ = size | $p_1(x) = 2$ | $b_1 = 0.2$ | $A(p_1) = 0.5$ |
| $p_2$ = color | $p_2(x) = 3$ | $b_2 = 0.2$ | $A(p_2) = 0.7$ |
| $p_3$ = brand | $p_3(x) = 10$ | $b_3 = 0.8$ | $A(p_3) = 0.3$ |

The direct scoring value for a parameter $p_k$ is C1 times the bucket value for the parameter k times the probability value, $A(p_k)$ of the parameter k.

$$D(p_k)=C1*b_k*A(p_k)$$

Continuing with the previous example, where C1 is set to 1:

$$D(p_1)=C1*b_1*A(p_1)=1*0.2*0.5=0.1$$

$$D(p_2)=C1*b_2*A(p_2)=1*0.2*0.7=0.14$$

$$D(p_3)=C1*b_3*A(p_3)=1*0.8*0.3=0.24$$

The confidence scoring algorithm 208 has a second stage which uses the affinity scoring value calculation. The affinity scoring value calculation of the parameter importance value $p_k$ of a product x is $R(p_k)$. In an example, k may be 1, 2 or 3, and we can calculate $R(p_1)$, $R(p_2)$ and $R(p_3)$. In other words, $R(p_1)$ is the affinity scoring value of the parameter $p_1$. The affinity scoring value measures the confidence value parameters with consideration of relationships or affinity between assigned parameter importance values. $R(p_k)$ represents the confidence score of the individual parameter now boosted by confidence scores of other parameters that it holds affinity for. This measurement is used in the confidence scoring algorithm 208. The confidence scoring algorithm 208 calculates a consolidated score of the assigned parameter values and affinity values. An affinity value with a low number may have less weight in the calculations than an affinity value with a high number.

The affinity value, $p_j(p_k)$, may be used in a calculation for the affinity scoring value calculation, $R(p_k)$, along with the direct scoring value calculation, $D(p_k)$.

The affinity scoring value calculator of the parameter value $p_k$, $R(p_k)$, is C2 multiplied by the equation of the direct scoring value for the parameter importance value $p_k$, $D(p_k)$, plus a summation of $D(p_j)$ times $p_j(p_k)$, where j ranges from 1 to the number of parameter values, exclusive of the value of k. C2 is an industry constant in the context of affinity scoring value calculation, which may be different from C1, may have a value between 0 and 1, and has a default value of 1.

$$R(p_k) = C2 * \left\{ D(p_k) + \sum_{j=1, j \neq k}^{n} [D(p_j) * p_j(p_k)] \right\}$$

Continuing with the example above, here are sample affinity values, which are repeated from Table 2, repeated below:

TABLE 2

Affinity Values

| | | |
|---|---|---|
| $p_1(p_2) = 0$ | $p_1(p_3) = 0.1$ | $p_3(p_2) = 0.4$ |
| $p_2(p_1) = 0.7$ | $p_3(p_1) = 1.0$ | $p_2(p_3) = 0.8$ |

Continuing with the previous example:

$$R(p_1) = C2 * \left\{ D(p_1) + \sum_{j=1, j \neq k}^{n} [D(p_j) * p_j(p_1)] \right\}$$
$$= 1 * \{D(p_1) + D(p_2) * p_2(p_1) + D(p_3) * p_3(p_1)\}$$
$$= 0.1 + 0.14 * 0.7 + 0.24 * 1.0 = 0.438$$

$$R(p_2) = C2 * \left\{ D(p_2) + \sum_{j=1, j \neq k}^{n} [D(p_j) * p_j(p_2)] \right\}$$
$$= 1 * \{D(p_2) + [D(p_1) * p_1(p_2)] + [D(p_3) * p_3(p_2)]\}$$
$$= 0.14 + 0.1 * 0 + 0.24 * 0.4 = 0.236$$

$$R(p_3) = C2 * \left\{ D(p_3) + \sum_{j=1, j \neq k}^{n} [D(p_j) * p_j(p_3)] \right\}$$
$$= 1 * \{D(p_3) + D(p_1) * p_1(p_3) + D(p_2) * p_2(p_3)\}$$
$$= 0.24 + 0.1 * 0.1 + 0.14 * 0.8 = 0.262$$

The direct scoring value calculation for the parameter importance value of k is $D(p_k)$. This can be compared to the affinity scoring value calculation for the parameter value of k, $R(p_k)$. The affinity scoring value calculation takes into account the affinity values and may be higher or lower than the direct scoring value calculation, depending on the confidence and affinity of other parameters and their parameter values.

The confidence scoring algorithm 208 has a third stage which uses the final confidence scoring value calculation. The final confidence scoring value calculation of the product x is S(x).

The final confidence scoring value calculation of the product x, S(x) may be calculated as follows. S(x) is a summation of the affinity scoring value calculation $R(p_k)$ times a product of an industry constant, C3, times an average or mean of the affinity scoring value calculation of the parameter importance values with a high bucket value, M(h), divided by an average of the affinity scoring value calculation of those parameter importance values with a low and medium bucket value, M(1+m). The industry constant, C3, may have a value between 0 and 1, may be different from C1 and C2, may be assigned by an administrator and may change over time as more information is collected. Continuing in the same example, the third parameter $p_3$, is the only parameter with a high bucket value. Therefore, M(h) will be the affinity scoring value calculation value of $p_3$, or $R(p_3)$. The first parameter $p_3$ and the second parameter $p_3$ are both low bucket value. Therefore, M(1+m) will be the average of $R(p_1) + R(p_2)$.

$$S(x) = \sum_{k=1}^{n} R(p_k) * \left\{ C3 * \frac{M(h)}{M(m+l)} \right\}$$

While performing the above calculation for S(x), the final confidence scoring value calculation of the product x, if M(m+1) is 0, then the denominator should be replaced by the number 1. If M(h) is 0, which means there are no high value bucket parameters observer, then M(h) should be replaced by 1 in the equation. In the case where both M(h) and M(m+1) are 0, this indicated that no parameter values where measured, and then the S(x) algorithm does not proceed further and S(x)=0. In other words, the product x final confidence score is 0, meaning there is no confidence in the product identification.

In the example, $$S(x) = \sum_{k=1}^{n} R(p_k) * \left\{ C3 * \frac{R(p_3)}{(R(p_1) + R(p_2))/2} \right\}$$

$$S(x) = \sum_{k=1}^{n} R(p_k) * \left\{ 1 * \frac{0.262}{(0.438 + 0.236)/2} \right\}$$

$$S(x) = \sum_{k=1}^{n} R(p_k) * \left\{ 1 * \frac{0.262}{(0.438 + 0.236)/2} \right\}$$

$$S(x) = \sum_{k=1}^{n} R(p_k) * \{0.774\}$$

$$S(x) = (R(p_1) + R(p_1) + R(p_1)) * \{0.777\} =$$
$$(0.438 + 0.236 + 0.262) * \{0.777\} = 0.727$$

The final confidence scoring value calculation, S(x), provides a confidence score of a product x, and provides a level of confidence that the recognized product is accurate. This provides a level of confidence, in combination with the calculated profile value, P(x), that the recognized product is accurate. There may be a minimum threshold set for the final confidence scoring value calculation, S(x), which is set by the administrator and may change over time. When the final confidence scoring value calculation, S(x), exceeds the minimum threshold for the final confidence scoring value calculation, there is a high level of confidence that the recognized product is accurate.

In the case where the calculated profile value for the product y, P(y), is considered a match for the calculated profile value for the product x, P(x), and the final confidence scoring value calculation for the product x, S(x), and the product y, S(y), both exceed the minimum threshold for the final confidence scoring value calculation, this provides a high level of confidence that the product x is the same as the product y, and this product matching may not require any further human inputs to set determine the product match is accurate.

In an additional example, the threshold for final confidence scoring value for a product may be 12, and S(x)=15 and S(y)=17. In this example, both S(x) and S(y) exceed the threshold. The profile value of x, P(x) may also be within a threshold difference of the profile value of y, P(y). Therefore the product x is considered to be the same as product y.

The final confidence scoring, S(x), may help to ensure that a number of parameters values matched with a high value bucket get a higher probability than if most of the parameters values fall in a medium value bucket or a low value bucket.

The confidence rating calculator models factors in parameters of image processing and sensors in the context of ecommerce, and the algorithm may be fine tuned for specific industry such as grocery-retail, apparel-retail, pharmacy-retail etc.

The range of values of the summation score may range from 0 to 1000 in an example. This range will vary depending on the amount of parameters and the range of the affinity values.

Figure 3:
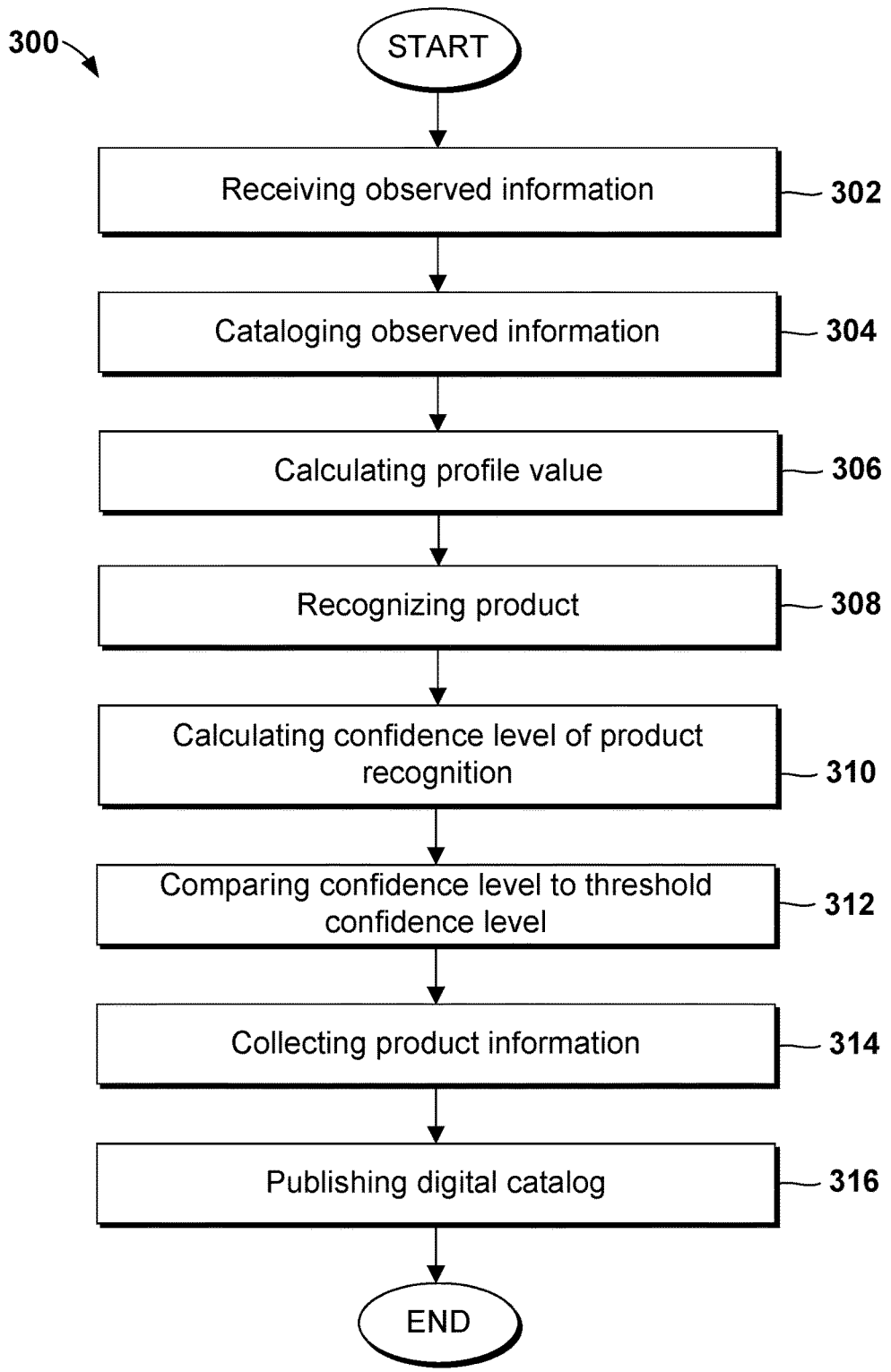
FIG. 3 is a flowchart depicting operational steps of the catalog digitization program within the data processing environment of FIG. 1, in accordance with an embodiment of the present invention.

Referring now to FIG. 3, a flowchart depicting operational steps of the program 300 for catalog digitization, in accordance with an embodiment of the present invention, is shown.

First, the program 300 receives observed information, at step 302. The observed information may include photos and videos of the retail shop space and storage space, for example photos and videos of product display and shelves and storage areas, in addition to surveillance photos and video, delivery photos and videos, sensors such as at a sales counter, and voice recognition input. The observed information may be from the still camera 116, the video camera 118, the sensor 120, the barcode scanner 122, the voice recognition device 124, the smart phone 126, or some other combination thereof. Known product recognition software may include image processing to identify logos, optical character recognition ("OCR") to identify text or bar code scanners to identify unique codes and then search against a data store to recognize a product being analyzed. OCR is a technology that converts different types of documents such as PDF files and images into editable and searchable data. In an embodiment, the traditional product recognition may be augmented by collecting observed information and recognition of products in the vicinity of display in the retail shop space, product occurrence frequency, and patterns of products frequently sold, in addition to a product physical characteristics or physical attributes. The model and algorithm of bringing in additional observed information may help to accurately identify products in the retail shop available for sale by identifying parameters and parameter values of a product, for example, a product x. Parameters of a product may include shape and weight, while parameter values may include round and 1 lb., respectively.

In an embodiment, an administrator may visit a shop or store to assist in the creation of an internet or e-catalog. The administrator may install one or more still cameras 116, video cameras 118, and voice recognition devices 124. For example, there may be a still camera 116 installed at the counter of the store, a video camera 118 installed at the back of the store pointing at the aisles and another video camera 118 may be installed at an entrance of a storage room. In addition, there may be one or more high resolution photographs of each of the aisles taken by the still camera 116. The high resolution photographs, camera input, video camera input and voice recognition input may be in a digital format and may be fed into the program 300.

The administer may assist a shop owner by performing the installation of the items which are collecting data in a shop, collecting the observed information, running the selective dameon 200, the matching algorithm 202, the confidence scoring algorithm 208 and the program 300, and creating the digital catalog or e-catalog.

Next, the program 300 catalogs the observed information and parameter values collected during step 302, at step 304. The input may be from, for example, photos, video and voice recognition. The digital input collected may be stored in a database, for example this information may be stored in the data storage device 114 as shown in FIG. 1, at step 302. The parameter values of the product x may be used to cataloging the observed information of a product x into categories such as pharmaceutical items, household items, food items, clothing, etc., using a commercially available image processing algorithm.

Then, the program 300 calculates a profile value for the product x, at step 306, where the profile value is dependent on the parameter importance values and the affinity values. The profile value is described above in regards to FIG. 2 and the matching algorithm 202. The profile value may be referred to as a product profile.

Next the program 300 recognizes product, utilizing known product recognition software, at step 308. The program 300 may create a product profile from physical attributes of a product. The product profile may include parameters and parameter values. Physical attributes or parameters may include parameter values such as product dimensions, product shape, product color, text, numbers and images shown on the product or on the product package, and product price. Physical attributes or parameters may include the parameter values such as product location in the store, product location in a storage room, and neighboring product profiles. Parameter values may be stored as defining and descriptive attributes in a database table. Neighboring product profiles may be useful as similar products may be stored or shelved near each other, for example, first aid items may be stored in the same area. Product profiles may be fed into the matching algorithm 202, as described above in relation to FIG. 2. In an embodiment, a product profile or parameter values may include neighboring product location and may additionally include product profile or parameter values of products which are purchased during the same transaction. A set of algorithms can be used by the matching algorithm 202 to cross references observations from each individual device or product profile with a knowledge base of information, and historic data.

The confidence scoring algorithm 208, as described above in relation to FIG. 2, may be used to calculate a final confidence scoring calculation of an accuracy of product identification, at step 310. The matching algorithm 202 may use information related to parameters and parameter values, such as product name, brand, dimensions, volume, price, color, manufacturer etc. The confidence scoring algorithm 208 may focus on high probability overlaps, or similar profile values, for example, a similar parameter values on price and brand is likely to yield a high final confidence scoring value calculation compared to similar parameter values on dimensions and color, when comparing product x and product y. The confidence scoring algorithm 208 may then calculate a final confidence scoring value calculation for each comparison of product x to product y, and product x to a product z, and so on.

The confidence scoring algorithm 208 may compare a final confidence scoring value calculation against a configurable threshold of a final confidence scoring value calculation to determine if a product is reasonably recognized or if manual input may be needed, at step 312.

Once a product is recognized it can then be augmented or supplemented with information from a product manufacturer or other information source, for example social media and internet, from product manufacture catalogs, cloud services both private and public among other sources, and have manual input as well to enrich the product information and create the final digital catalog, at step 314.

Then, the program 300 publishes a digital catalog at step 316. The resulting catalog that can further be enhanced with content and published in a digital store, for example on the internet. A digital catalog consists of list of products and its descriptions in a data storage device, the data storage device may be a relational database systems, an in-memory system, distributed or local data storage, for example the data storage device 110 as shown in FIG. 1. The data storage device may be part of the client computer 102 and data storage device 114 as shown in FIG. 1 and may be used as an online e-commerce solution or in backend operations such as procurement, fulfillment or inventory keeping. The digital catalog may be used by an online e-commerce stores to display products for shoppers to buy, by marketers to configure discounts, by merchandisers to create cross-sell/up-sell opportunities, by warehouse managers to keep track of stock, by the employees to fulfill orders, among other uses.

The algorithm uses a product profiling strategy that allows information observed to be combined with other relevant information to form a profile of the product from various perspectives. Comparison based on product profile enhances ability to match products that may significantly vary in individual parameter values observed, but may match because its overall profile is similar.

The program 300 enhances image processing based product recognition by adding contextual intelligence related to product identification, product enrichment and validation within the context of retail.

An example follows. The program 300 may run more than one time, and may continuously run to improve the quality of product identification and to increase the number of products in the e-catalog. In a first pass, the program 300 may uses a commercially available image processing algorithm to identify product information at step 306, for example a parameter value of a product name or a brand/logo may be has been captured in a photo or a video from step 302. Some products may be identified with reasonable probability via this method, as per step 308. In a second pass the program 300 may cross reference more than one photograph or video and combine parameter values of a partial logo with text recognition from each photograph to form more complete parameter values of physical attributes, at step 306, and increase the probability of product recognition, at step 308. In a third pass, the program 300 may calculate a product profile of a product with recognized parameter value, with attributes such as color profile, dimensions, amount of visible text, visible numbers, transparency properties and neighborhood, at step 306. The product profile may be compared with another product profile for overlaps and possible matches, at step 308. In a fourth pass, parameter values for product location, video and audio from step 302 may be analyzed for a possible product recognition at step 306, based on product location and information from product purchase at the checkout counter, from step 302. Thus, a combination of product profiles captured are augmented from the store location to the checkout location. Similar profiling can be performed for journey of the product from store room to shelf also. Overlaps between the shop video, counter video, storeroom video and aisle photos provide a higher probable recognition of a product identification, via parameter values.

An advantage of this system and method is the non-intrusiveness and the reduced amount of time required to quickly come up with an initial set of products in a digital format and ready for use in an e-catalog. By being non-intrusive, an initial set of products can be more quickly developed into an e-catalog as compared to a system where the catalog is developed manually. In a store, there may be a small percentage of products which are fast moving, being purchased and sold quickly, and this small percentage of product may account for a significant portion of revenue earned. This invention can quickly get the high turn around items in a digital format, which can be ready for an eCommerce solution.

This model and algorithm improves accuracy of analysis of products in a retail scenario, where there may be a low quantity of a product and the product may be positioned in a way which hides a logo or other recognizable traits.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
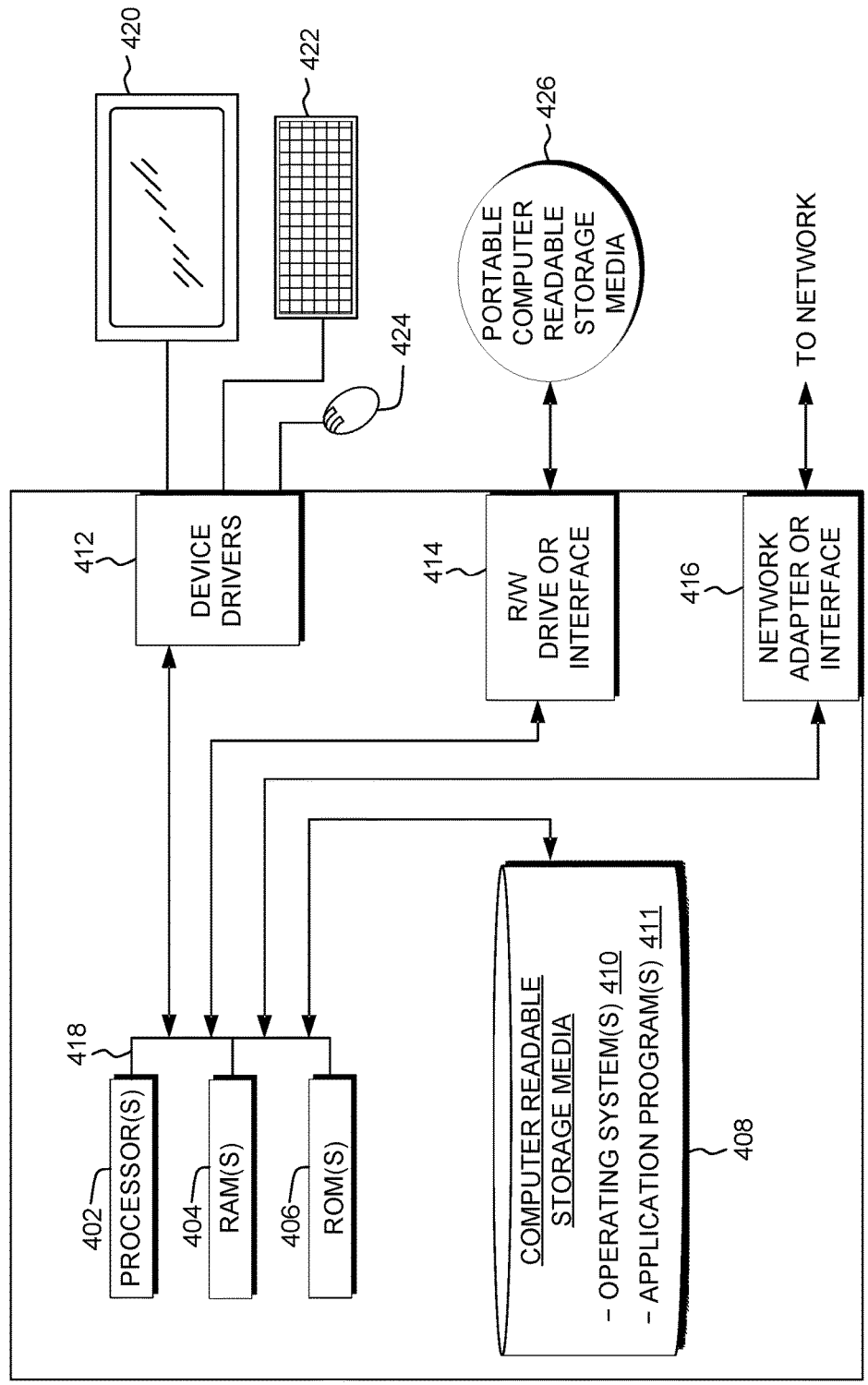
FIG. 4 is a functional block diagram of components of the proxy server computer executing the author anonymization program, in accordance with an embodiment of the present invention.

Referring now to FIG. 4, a block diagram of components of a computing device, such as the client computer 102 or the server computer 104, of the system 100 of FIG. 1, in accordance with an embodiment of the present invention is shown. It should be appreciated that FIG. 4 provides only an illustration of one implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the program 300, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include a network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for catalog digitization of a plurality of products in a shop, the method comprising:
    receiving captured photographs of the plurality of products from a camera mounted in the shop;
    receiving captured video of the plurality of products from a video camera mounted in the shop, wherein the captured video comprises photographs and audio;
    generating a set of descriptions from the captured photographs by extracting physical attributes from the captured photographs and the captured video using image recognition technology, and from the captured audio from the captured video using voice recognition software, wherein the physical attributes are selected from a group consisting of a dimension, a shape, a weight, a color, a price, a location in the store, and words spoken when someone is holding or pointing to each product of the plurality of products;
    assigning an importance value to each physical attribute based on a likelihood of each physical attribute positively identifying a product;
    organizing the set of descriptions into product categories based on the physical attributes of each description of the set of descriptions and their corresponding importance value, wherein a importance value is dependent on a product category;
    combining one or more groups of one or more descriptions of the set of descriptions into one or more product descriptions, based on multiple iterations of comparison of each physical attribute of each description of the set of descriptions, the product category of each description of the set of descriptions, a likelihood of any two physical attributes of each description of the set of descriptions being observed together, on the importance value of each physical attribute of each description of the set of descriptions, calculation of a confidence score of a match between one or more groups of one or more descriptions of the set of descriptions, and comparing the confidence score to a predetermined confidence threshold,
    wherein the importance value of each physical attribute is updated on each iteration of comparison of each physical attribute of each set of descriptions, wherein the likelihood of each physical attribute positively identifying a product increases with each iteration of multiple iterations of comparison, wherein the confidence score is based on the physical attributes of each of the one or more groups of one or more descriptions of the set of descriptions and their corresponding importance value, and the confidence threshold is determined by an administrator;
    determining a product profile for each of the of the one or more product descriptions based on the corresponding one or more groups of the one or more descriptions of the set of descriptions;
    creating a digital product catalog comprising the one or more product profiles; and
    publishing the digital catalog on-line.

* * * * *